United States Patent
Karppanen et al.

(10) Patent No.: US 10,845,978 B1
(45) Date of Patent: Nov. 24, 2020

(54) SCROLL POSITIONING USING ELEMENT ASSOCIATION

(71) Applicant: Amazon Technologies, Inc., Seattle, WA (US)

(72) Inventors: Jari Juhani Karppanen, Bellevue, WA (US); Amey Shreekant Jahagirdar, Seattle, WA (US); Jae Yoon Kim, Seattle, WA (US); Kartikey Bhatt, Sammamish, WA (US); Serghei Drozdov, Seattle, WA (US); Sunitha Kalkunte Srivatsa, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 617 days.

(21) Appl. No.: 14/998,120

(22) Filed: Dec. 23, 2015

(51) Int. Cl.
*G06F 3/048* (2013.01)
*G06F 3/0485* (2013.01)
*G06F 3/0481* (2013.01)
*G06F 40/14* (2020.01)
*G06F 40/194* (2020.01)
*G06F 40/197* (2020.01)

(52) U.S. Cl.
CPC .......... *G06F 3/0485* (2013.01); *G06F 3/0481* (2013.01); *G06F 40/14* (2020.01); *G06F 40/194* (2020.01); *G06F 40/197* (2020.01)

(58) Field of Classification Search
CPC ......... G06F 17/30896; G06F 17/30905; G06F 17/2264; G06F 17/2211; G06F 17/2247; G06F 17/2288; G06F 17/30899; G06F 3/0485; G06F 16/9577

USPC .................................. 707/756, 811; 715/229
See application file for complete search history.

(56) References Cited

U.S. PATENT DOCUMENTS

| | | | | |
|---|---|---|---|---|
| 6,738,804 | B1 * | 5/2004 | Lo | G06F 16/9577 709/219 |
| 2007/0101293 | A1 * | 5/2007 | Cherry | G06F 3/048 715/823 |
| 2008/0307301 | A1 * | 12/2008 | Decker | G06F 17/30905 715/241 |
| 2009/0049062 | A1 * | 2/2009 | Chitrapura | G06F 17/30896 |
| 2015/0046832 | A1 * | 2/2015 | George | G06F 17/3089 715/744 |

(Continued)

FOREIGN PATENT DOCUMENTS

EP 3182302 A1 * 6/2017

*Primary Examiner* — Alex Olshannikov
(74) *Attorney, Agent, or Firm* — BakerHostetler

(57) ABSTRACT

Techniques for scroll positioning of electronic documents, such as web pages, using element association are described. One or more first document elements associated with a first scroll position of a first document version may be determined. One or more first data representations of the one or more first document elements may then be generated. One or more second document elements may then be determined from within a second (i.e., reloaded) document version. One or more second data representations of the one or more second document elements may then be generated. At least one association between at least one of the one or more first data representations and at least one of the one or more of the second data representations may then be determined. A second scroll position for display of the second document version may then be determined based, at least in part, on the at least one association.

15 Claims, 8 Drawing Sheets

(56) References Cited

U.S. PATENT DOCUMENTS

2016/0357382 A1* 12/2016 Metz .................... G06F 3/0485

* cited by examiner

SCROLL POSITIONING USING ELEMENT ASSOCIATION

BACKGROUND

The use of web pages and other electronic documents to convey information has increased dramatically in recent years. Electronic documents may convey information using various different types of documents elements, such as text, images, input fields, advertisements, links to other documents, embedded containers that include information from other documents (e.g., iframes), and others. In some examples, electronic documents may be represented using a model that may be employed for rendering of the documents. For example, web pages may be represented using a document object model (DOM) tree, which is a tree structure for rendering of documents such as hypertext markup language (HTML) pages. One characteristic of electronic documents is that they may often include more information than may fit within an existing displayed user interface view. One technique for traversing an electronic document in this scenario, referred to as document scrolling, allows users to select which portions of the electronic document are displayed within a user interface view. Scrolling may often be controlled, for example using scroll panes, touchscreens, arrow keys, mouse click-wheels, and/or other controls that allow documents to be horizontally, vertically, and/or otherwise adjusted so as to select the displayed portion of the document. One problem related to scrolling of electronic documents is that, when an electronic document is reloaded, it may often be difficult to re-position the reloaded document such that the user is viewing the same or similar document elements that the user was viewing prior to reloading. This problem may occur, for example, when document elements are added to or removed from the reloaded document or are otherwise modified within the reloaded document. In some cases, users may become confused and disoriented when a reloaded document displays different elements than those that were displayed previously. Additionally, users may also be forced to waste valuable time scrolling a reloaded document to attempt to relocate the previously displayed elements.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
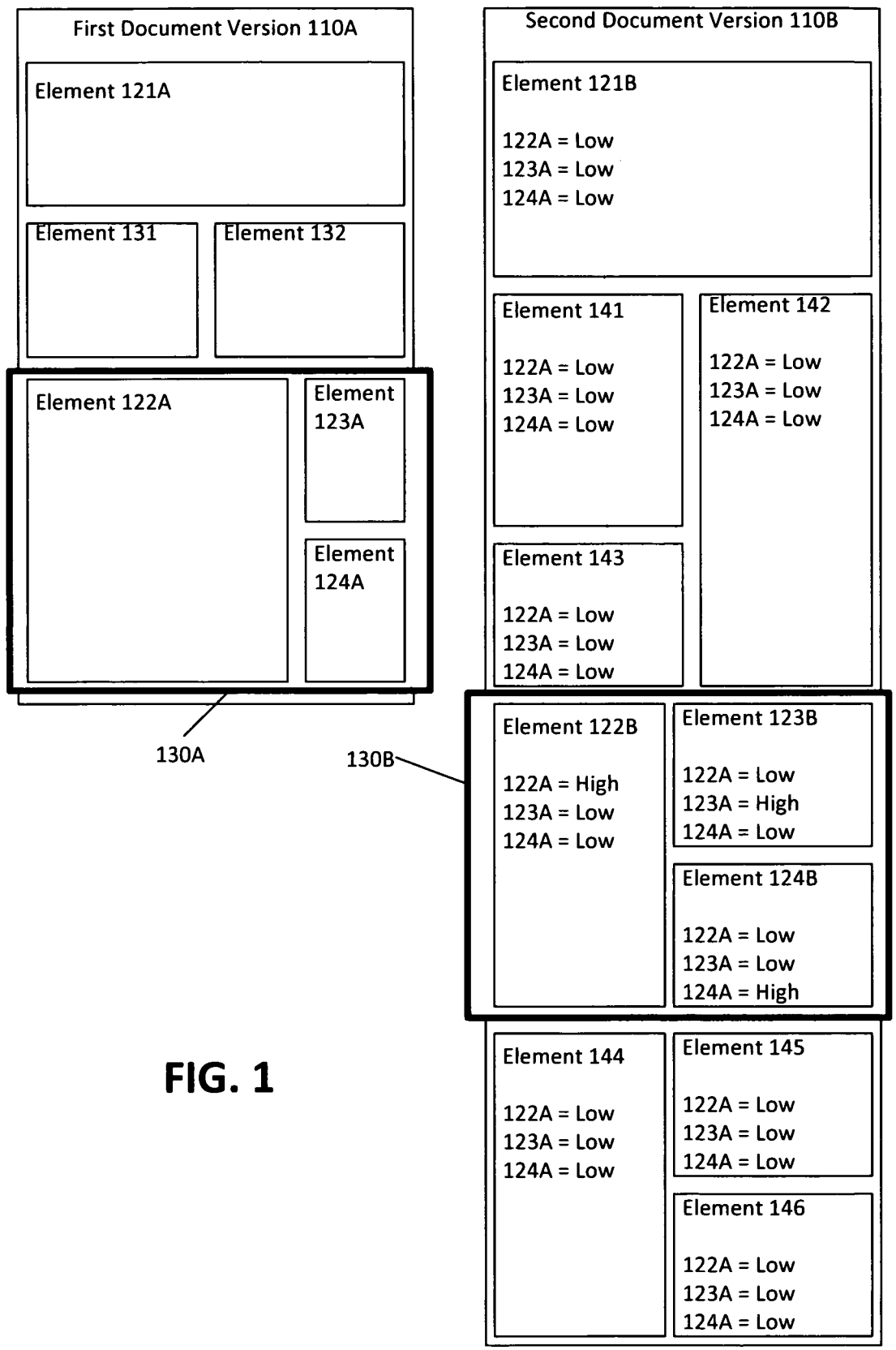
FIG. 1 is a diagram illustrating a first example element association-based scroll positioning that may be used in accordance with the present disclosure.

Techniques for scroll positioning of electronic documents, such as web pages, using element association are described herein. In some examples, an electronic document may be loaded by retrieving a first version of the electronic document. The first version of the electronic document may include a first plurality of document elements, such as text, images, input fields, advertisements, links to other documents, nested documents, embedded containers that include information from other documents (e.g., iframes), and others. At least part of the first version of the electronic document associated with a first scroll position may be displayed, for example using a web browser or other content presentation component. In some examples, the first scroll position may be at a top or other starting position of the first version of the electronic document. Also, in some examples, the first scroll position may be a position that is offset from the top or start of the electronic document, such as a position to which a user has scrolled the first version of the electronic document. In some cases, one or more first document elements associated with the first scroll position may be determined from the first plurality of document elements. The one or more first document elements may include, for example, one or more document elements that are wholly or partially displayed in association with the first scroll position. In some examples, the one or more first document elements may be determined based, at least in part, on a model of the first version of the electronic document, such as a document object model (DOM) tree. One or more first data representations of the one or more first document elements may then be determined. In some examples, the one or more first data representations may be generated by applying a data representation function to the one or more first document elements, such as a rolling hash or other hash function, a checksum function, a lossy compression algorithm, a Fourier Transform algorithm, a fingerprint algorithm, a delta encoding algorithm, and other data representation functions.

Additionally, in some examples, the electronic document may be reloaded by retrieving a second version of the electronic document. The second version of the electronic document may include a second plurality of document elements that is at least partially different from the first plurality of document elements. For example, in some cases, document elements from the first plurality of document elements may be removed from the second plurality of document elements or may be modified within the second plurality of document elements. Also, in some cases, document elements not included within the first plurality of document elements may be added to the second plurality of document elements. In some examples, one or more second document elements included within the second version of the electronic document may then be determined, for example based on a model of the second version of the electronic document, such as a DOM tree. One or more second data representations of the one or more second document elements may then be generated. In some examples, the one or more second data representations may be determined by applying, to the second document elements, the same or a similar data representation function as was used to generate the first data representations.

The one or more first data representations may then be compared to the one or more second data representations. At least one association may then be determined between at least one of the one or more first data representations and at least one of the one or more of the second data representations. In some examples, the at least one association may be determined based, at least in part, on an amount of correlation between the one or more first data representation and the one or more second data representations, such as a number of matching hashes between the data representations. For example, in some cases, one or more second data representations that have a highest amount of correlation and/or that exceed a threshold amount of correlation to the first data representations may be determined to have an association with the first data representations. Also, in some examples, correlations between representations of different types of document elements may sometimes be weighted differently from one another. For example, correlations between representations of text elements may sometimes be weighted higher than correlations between representations of other types of elements, such as images, input fields, or advertisements.

Upon determining of the at least one association, a second scroll position for the second version of the electronic document may then be determined based, at least in part, on the at least one association. A portion of the second version of the electronic document associated with the second scroll position may then be displayed. For example, in some cases, the portion of the second version of the electronic document associated with the second scroll position may be displayed initially (e.g., automatically) upon loading of the second version of the electronic document without requiring input from the user to select or identify that portion of the document. In some examples, the displayed portion of the second version of the electronic document may include one or more document elements that are the same or similar or that are otherwise associated with document elements that were displayed in association with the first scroll position of the first version of the electronic document. This may be advantageous, for example, by providing greater continuity for the user, reducing or eliminating user confusion when a page is reloaded, and reducing or eliminating the need to search for elements that were displayed in association with the first scroll position prior to reloading.

FIG. 1 is a diagram illustrating a first example scroll positioning based, at least in part, on element association that may be used in accordance with the present disclosure. As shown, FIG. 1 includes side-by-side views of a first document version 110A and a second document version 110B of an electronic document 110. The first document version 110A is loaded and displayed prior to loading and display of second document version 110B. Second document version 110B is a version of the electronic document 110 that is retrieved by reloading of the electronic document 110 subsequent to loading and display of first document version 110A.

The electronic document 110 is a document that is presented electronically, such as a web page, word processing document, other productivity or media application document, and the like. In some examples, the electronic document may be presented using a document presentation program, such as a web browser, word processing application, other productivity or media application, and the like. In some examples, the electronic document may be transmitted between computing devices, such as from a server to a client, over one or more computer networks, such as a local area network (LAN) and the Internet or other wide area network (WAN).

In some examples, electronic document 110 may be loaded and/or reloaded in response to various commands, such as typing and entering a web or other address for the document, activating a back, forward, refresh, or other document navigation control, or otherwise loading and/or reloading an electronic document. As a specific example, in some cases, second document version 110B may be loaded and displayed in response to activation of a refresh button during a time that first document version 110A is displayed. As another specific example, first document version 110A may be displayed, and a user may activate a link on first document version 110A to navigate to a different electronic document (not shown). During a time that the different electronic document is displayed, the user may activate a back button, which results in navigation back to electronic document 110 and to loading and display second document version 110B. As yet another specific example, first document version 110A may be displayed, and a user may activate a back button to navigate to a different electronic document (not shown). During a time that the different electronic document is displayed, the user may activate a forward button, which results in navigation forward to electronic document 110 and to loading and display second document version 110B. As yet another specific example, first document version 110A may be displayed and then closed. The user may then re-type or otherwise re-enter an address for the electronic document 110, which causes the user to reload the electronic document 110 and to load and display second document version 110B. It is noted that the above examples are non-limiting and that many other examples of loading and reloading of an electronic document may also be employed.

It is noted that there is not necessarily any required or limiting time period within which first document version 110A and second document version 110B must be loaded and displayed relative to one another. Put another way, there is not necessarily any limit on an amount of time that may expire between loading of first document version 110A and second document version 110B. In some examples, second document version 110B may be loaded and displayed seconds, minutes, hours, days, or longer after loading and display of first document version 110A. It is also noted that second document version 110B need not necessarily be a version of electronic document 110 that immediately follows first document version 110A. For example, in some cases, any number of intermediate versions of electronic document 110 may be generated between first document version 110A and second document version 110B. Rather, document versions 110A and 110B are merely intended to refer to versions of electronic document that are made available for retrieval at times at which they are requested for presentation. It is also noted that the term document version is used herein merely to refer to an instance of a document in which an element or other portion of a document has been added, deleted, or otherwise changed relative to a prior or subsequent instance of the document. There is no requirement that document versions must be specifically designated or identified as distinct versions or that a subsequent version of a document must be technically superior or otherwise improved relative to a prior version.

As shown in FIG. 1, first document version 110A of electronic document 110 includes six document elements 121A-124A, 131, and 132. Document elements 121A-124A, 131, and 132 may include any combination of one or more types of document elements, such as text, images, input fields, advertisements, links to other documents, nested documents, embedded containers that include information from other documents (e.g., iframes), and others. As should be appreciated, while, in the example of FIG. 1, six document elements are included in first document version 110A, an electronic document in accordance with the disclosed techniques may include any number of document elements including any types and/or amounts of data.

In the example of FIG. 1, a displayed portion 130A of first document version 110A is shown as a thick black box. Displayed portion 130A indicates a portion of first document version 110A that is displayed on a display screen just prior to termination of the display of first document version 110A. As shown, displayed portion 130A includes document elements 122A, 123A and 124A. Displayed portion 130A is associated with a respective scroll position. Generally, a scroll position is a position associated with scrolling of an electronic document. In some examples, a scroll position may be represented using an offset value, such as an offset from a top or other designated starting position of an electronic document. In some examples, such as shown in FIG. 1, a scroll position may indicate that the document has been scrolled away from a top or other designated starting position of an electronic document, which may sometimes be indicated by the scrolling position having a non-zero value. Also, in some examples, a scroll position may indicate that the scroll position of the document is at the top or other designated starting position of an electronic document, which may sometimes be indicated by the scrolling position having a zero value. In some examples, such as when a document may be scrolled in multiple directions (e.g., vertically, horizontally, and other directions), a scroll position may have multiple values, for example corresponding to offsets in multiple directions. A scroll position associated with a displayed portion of a first version of the electronic document (in this example displayed portion 130A) is referred to herein as a first scroll position.

As shown in FIG. 1, second document version 110B of electronic document 110 includes ten document elements 121B-124B and 141-146. Document elements having reference numbers that end with A or B are document elements that have corresponding elements in both first document version 110A and second document version 110B. In particular, document elements 121B-124B in second document version 110B correspond to document elements 121A-124A in first document version 110A. By contrast, document elements 131 and 132 in first document version 110A do not have corresponding document elements in second document version 110B. This means that document elements 131 and 132 were removed from electronic document 110 at some time between the loading of first document version 110A and the loading of second document version 110B. Additionally, document elements 241-246 in second document version 110B do not have corresponding document elements in first document version 110A. This means that document elements 141-146 were added to electronic document 110 at some time between the loading of first document version 110A and the loading of second document version 110B.

As set forth above, document elements 121B-124B in second document version 110B correspond to document elements 121A-124A in first document version 110A. In some examples, document elements 121B-124B may be identical or nearly identical to corresponding document elements 121A-124A. Also, in some examples, document elements 121B-124B may include one or more changes relative to corresponding document elements 121A-124A, such as one or more added features, one or more removed features, or otherwise changed features. These include changes that were applied to document elements 121A-124A at some time between the loading of first document version 110A and the loading of second document version 110B. As a specific example, if document element 121A is a text element, changes to document element 121B relative to document element 121A may include added and deleted words and characters, formatting changes (e.g., size, spacing, color, underlining and other effects), and other changes. Additionally, the sizes, shapes, and positions of document elements 121B-124B may also change relative to corresponding document elements 121A-124A. For example, as shown in FIG. 1, the size of document elements 121B, 123B, and 124B have increased in second document version 110B relative to the sizes of corresponding document elements 121A, 123A, and 124A in first document version 110A. By contrast, the size of document element 122B has decreased in second document version relative to the sizes of corresponding document element 122A in first document version 110A.

In the example of FIG. 1, displayed portion 130B of second document version 110B is shown as a thick black box. Displayed portion 130B indicates a portion of second document version 110B that is initially displayed on a display screen upon loading and display of second document version 110B. As shown, displayed portion 130B includes document elements 122B-124B, which correspond to document elements 122A-124A displayed in displayed portion 130A. Displayed portion 130B is associated with a respective scroll position. A scroll position associated with a displayed portion of a second version of the electronic document (in this example displayed portion 130B) is referred to herein as a second scroll position.

As will be described in detail below, the techniques disclosed herein may allow the initial second scroll position of second document version 110B (e.g., the scroll position with which displayed portion 130B is associated) to be determined based, at least in part, on correlations between representations of document elements 122A-124A in first document version 110A and corresponding document elements 122B-124B in second document version 110B. In particular, in some examples, it may be determined that document elements 122A-124A are associated with the first scroll position (e.g., the scroll position with which displayed portion 130A is associated), for example, based on their inclusion within displayed portion 130A. Data representations of document elements 122A-124A in first document version 110A may then be generated. As described below, the data representations may be generated by applying a rolling hash or other hash function, a checksum function, a lossy compression algorithm, a Fourier Transform algorithm, a fingerprint algorithm, a delta encoding algorithm, and other data representation function to the document elements 122A-124A. In some examples, upon loading of second document version 110B, data representations of document elements 121B-124B and 141-146 in second document version 110B may then be generated. In some examples, the representations of document elements 112A-124A may then be compared to the representations of document elements 121B-124B and 141-146, for example to determine an amount of correlation between the data representations.

In the example of FIG. 1, indications are shown of an amount of correlation between representations of document elements 122A-124A and representations of document elements 121B-124B and 141-146. In particular, within each document element 121B-124B and 141-146, an indication is shown of that document element representation's relative correlation to representations of document elements 122A-124A. For example, as shown in FIG. 1, the representations of each of document elements 121B and 141-146 have a low amount of correlation to the representations of each of document elements 122A-124A. This is indicated by the words "122A=Low", "123A=Low", and "124A=Low" in each of document elements 121B and 141-146. By contrast, the representation of document element 122B has a high amount of correlation to the representation of corresponding document element 122A. This is indicated by the words "122A=High" in document element 122B. Additionally, the representation of document element 123B has a high amount of correlation to the representation of corresponding document element 123A. This is indicated by the words "123A=High" in document element 123B. Furthermore, the representation of document element 124B has a high amount of correlation to the representation of corresponding document element 124A. This is indicated by the words "124A=High" in document element 124B. Thus, in the particular example of FIG. 1, the correspondence between document elements 122A and 122B, 123A and 123B, and 124A and 124B has resulted in a high correlation between representations of those document elements.

As will also be described in detail below, the determined high correlations between representations of document elements 122A and 122B, 123A and 123B, and 124A and 124B may result in document elements 122B, 123B, and 124B being used to determine the initially displayed scroll position of second document version 110B. In particular, as shown in FIG. 1, document elements 122B, 123B, and 124B are each included within displayed portion 130B, which is associated with the initial scroll position of second document version 110B. Thus, the initially displayed portion 130B of second document version 110B may include document elements 122B-124B, which correspond to document elements 122A-124A that were included in displayed portion 130A of first document version 110A just prior to termination of the display of first document version 110A. This may be advantageous, for example, by providing greater continuity for the user, reducing or eliminating user confusion when a page is reloaded, and reducing or eliminating the need to search for elements that were displayed at the first scroll position prior to reloading.

Figure 2:
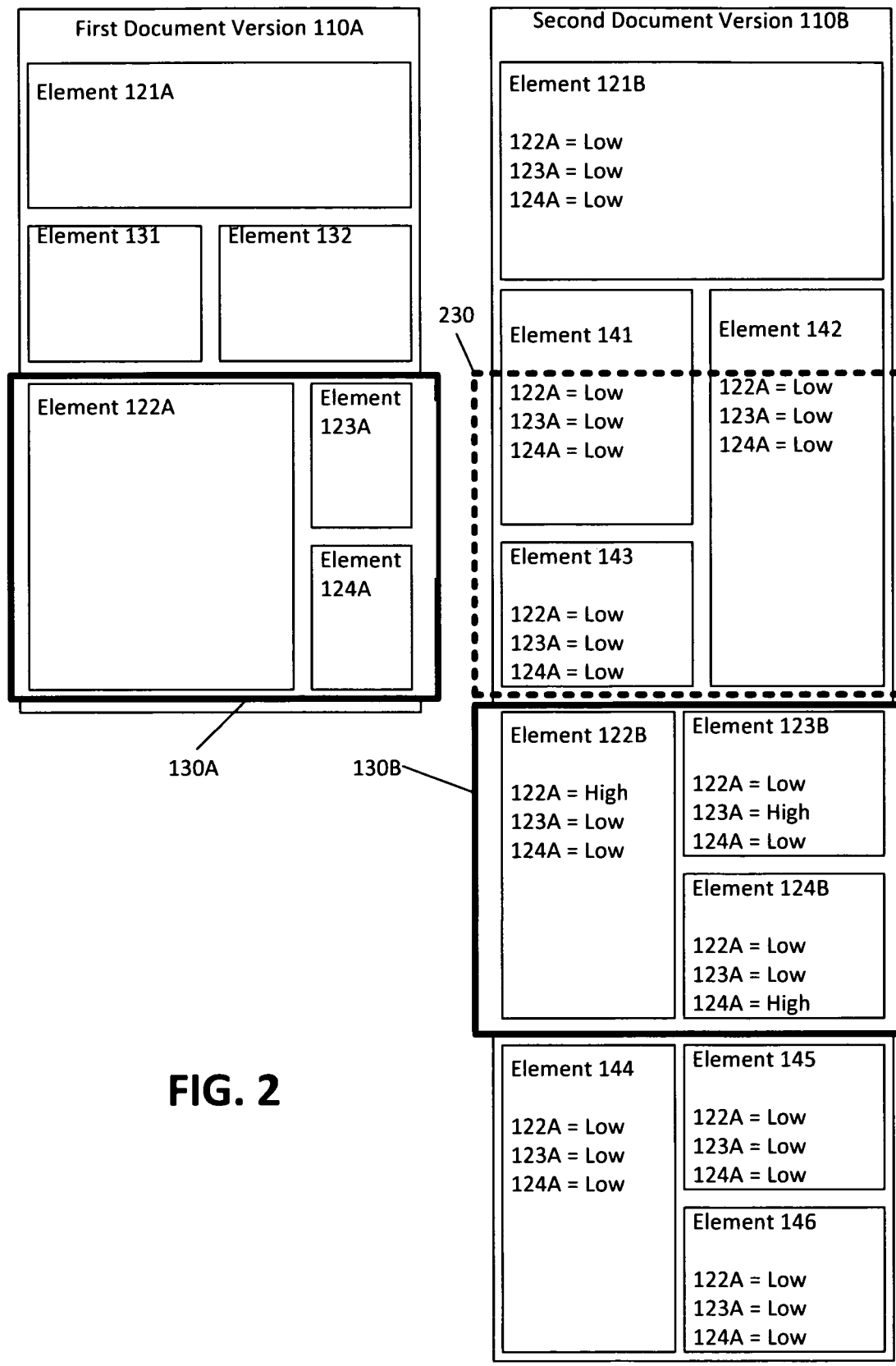
FIG. 2 is a diagram illustrating an example comparison between element association-based scroll positioning and offset-based scroll positioning.

In contrast to the above described techniques, some conventional document display techniques may determine a scroll position for a reloaded document based only on the scroll offset of the prior loaded document. For example, referring now to FIG. 2, the scroll offset of first document version 110A may, in some examples, be represented as the distance from the top of first document version 110A to displayed portion 130A. Using the conventional offset-only techniques, the second scroll position of the second document version 110B would be assigned to have the same offset value as the first scroll position. As should be appreciated, this would result in the initial displayed portion of second document version 110B being positioned at the same offset as displayed portion 130A. As shown in FIG. 2, the initial displayed portion of second document version 110B using the offset-only technique is shown as displayed portion 230, which is depicted using thick dashed lines. As shown, displayed portion 230 is positioned at the same offset as displayed portion 130A, which, in the example of FIG. 2, results in displayed portion 230 being positioned directly horizontally across from displayed portion 130A. This results in displayed portion 230 including all of document element 143 and parts of document elements 141 and 142. By contrast, document elements 122B-124B are not included in displayed portion 230. Thus, in this example, the conventional offset-only techniques may be confusing to users, for example because the initial display portion 230 of second document version 110B would include document elements 141-143, which were not included in first document version 110A. The user may, therefore, not recognize document elements 141-143 and may not be aware that the second document version 110B is a reloaded version of a prior displayed electronic document. Moreover, if the user wishes to locate document elements 122B-124B, the user may be forced to scroll through second document version 110B, sometimes in multiple different directions, thereby further inconveniencing the user. For these and other reasons, it is submitted that the disclosed element-association based scroll techniques offer a number of advantageous in relation to conventional scroll positioning techniques such as those described above.

Figure 3:
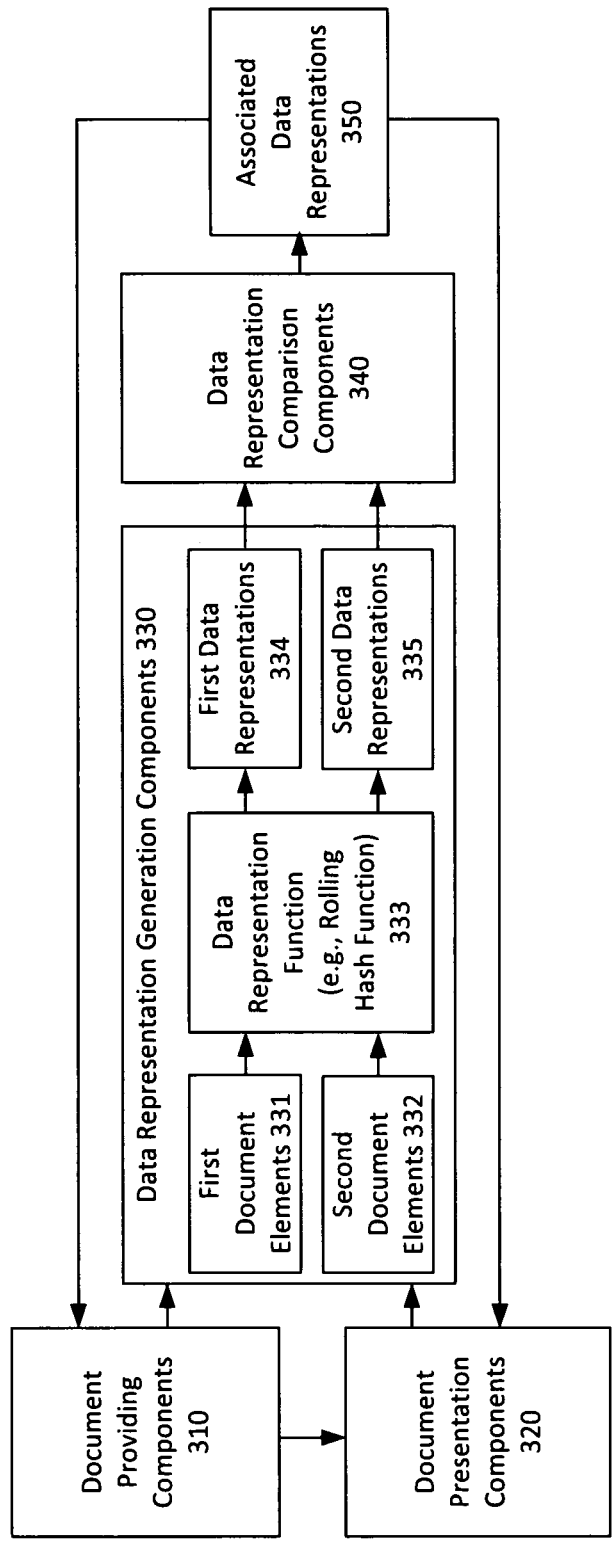
FIG. 3 is a diagram illustrating an example element association-based scroll positioning system that may be used in accordance with the present disclosure.

FIG. 3 is a diagram illustrating an example element association-based scroll positioning system that may be used in accordance with the present disclosure. As shown in FIG. 3, document providing components 310 may communicate with document presentation components 320 to effectuate providing and presenting of an electronic document, such as a web page, word processing document, other productivity or media application document, and the like. In one particular example, document presentation components 320 may include a web browser, while document providing components 310 may include one or more web servers. In some examples, such as in the case of some remote desktop applications, both document providing components 310 and document presentation components 320 may execute, at least in part, on one or more servers. In some examples, document providing components 310 and document presentation components 320 may communicate using one or more communications networks, including a local area network (LAN) and a wide area network (WAN) such as the Internet. In other examples, document providing components 310 and document presentation components 320 may execute on a single node or device and may communicate locally with one another on the single node or device.

Document presentation components 320 may display a first document version, such as first document version 110A of FIG. 1, which is a first version of an electronic document. The displayed first document version may include various document elements, such as document elements 121A-124A, 131, and 132 of FIG. 1, which may include, for example, text, images, input fields, advertisements, links to other documents, nested documents, embedded containers that include information from other documents (e.g., iframes), and others. As set forth above, in some examples, at least a portion of the first document version associated with a first scroll position may be displayed, such as displayed portion 130A of FIG. 1.

In some examples, document presentation components 320 and/or document providing components 310 may determine one or more first document elements 331, which are document elements that are associated with the first scroll position of the first document version. In some examples, the one or more first document elements may be determined based, at least in part, on a model of the first version of the electronic document, such as a document object model (DOM) tree, for example to determine the identities, types, locations and other information about document elements within the first document version. In some examples, the first document elements 331 may include document elements that are within a specified distance range relative to the first scroll position. In some cases, the first document elements 331 may include document elements wholly and/or partially displayed in association with the first scroll position. For example, referring back to FIG. 1, document elements 122A-124A are displayed within displayed portion 130A in association with the first scroll position. It is noted, however, that there is no requirement that the first document elements 331 must be wholly or partially displayed in association with the first scroll position. For example, in some cases, the first document elements 331 may include document elements positioned outside of the displayed scroll position, such as one or more adjacent document elements. In some examples, a displayed portion of the first document version (e.g., displayed portion 130A) and/or an area adjacent or otherwise close to the displayed portion of the first document version may be sampled, for example using a pattern, to select the first document elements 331 (and/or locations associated therewith) for which one or more first data representations 334 are generated and stored as described below. In some cases, sampling of the displayed portion and/or an adjacent area may be advantageous because it may, for example, allow the first data representations 334 to be generated without having to process document elements that are not located within or near the displayed portion of the document and which may not be relevant to scroll position determination.

In some examples, there may be a specified minimum and/or maximum quantity, percentage, or other amount of document elements that may be included within the first document elements 331. In one specific example, it may be specified that at least two but no more than five document elements may be included within the first document elements 331. Also, in some examples, the amount of document elements included within the first document elements 331 may be determined based, at least in part, on one or more document element types. In one specific example, a larger number of text elements may be included within the first document elements 331 than other types of document elements. One potential reason for this is that text elements may sometimes be considered to be more reliably matched to one another than other types of document elements. Furthermore, in some examples, one or more types of document elements may be filtered-out or otherwise excluded from being included within the first document elements 331. In one specific example, advertisements and/or embedded container elements (e.g., iframes) may be excluded from being included within the first document elements 331. One potential reason for this is that advertisements and embedded container elements may often be changed and updated frequently and may sometimes not be considered to be as reliably matched to one another as other types of document elements (e.g., text, images, etc.).

In some examples, upon determining the first document elements 331, document presentation components 320 and/or document providing components 310 may provide an indication of first document elements 331 to data representation generation components 330. Data representation components may then apply data representation function 333 to the first document elements 331 in order to generate first data representations 334. In some examples, data representation function 333 may be applied to data for the first document elements (e.g., text data, pixel and other image data, etc.) that is identified and/or accessed based, at least in part, on a model of the first version of the electronic document, such as a DOM tree. Data representation function 333 may include a function that is used to generate a data representation of a document element. Some example data representation functions 333 may include a rolling hash or other hash function, a checksum function, a lossy compression algorithm, a Fourier Transform algorithm, a fingerprint algorithm, a delta encoding algorithm, and other data representation functions. The data representation function may, in some examples, reduce the amount of storage capacity required to store a data representation in comparison to a document element that the data representation represents. For example, a rolling hash of a document element may often allow a document element to be represented using significantly less data than the amount of data included in the document element itself, thereby reducing storage capacity for storing the rolling hash of the document element in comparison to the document element itself. In one specific example, data representation function 333 may include a Rabin-Karp rolling hash function. In another specific example, data representation function 333 may include an Adler-32 checksum algorithm. In yet another specific example, data representation function 333 may include xdelta3 algorithm, which is a delta encoding algorithm. In some examples, the data representation function 333 may include a custom data representation function and may include multiple data representation functions and/or any combinations thereof. In some examples, data representation function 333 may be selected based on considerations including, but not limited to, required storage resources for the resulting calculated data representations, resulting reliability associated with matching data representations for corresponding or other similar document elements, complexity of implementation of the data representation function, time, processing, and other resources required to implement the data representation, and other considerations.

Thus, as set forth above, first data representations 334 may be determined by applying data representation function 333 to first document elements 331. In some examples, upon being generated, first data representations 334 may be stored, for example in memory for later use. As also set forth above, in addition to the first document version, document providing components 310 may also load and a display a second document version, such as second document version 110B of FIG. 1, which is a reloaded version of the same electronic document. Some example actions that may cause loading and display of the second document version (e.g., entering the document address, activating a back, forward, or refresh control, etc.) are described in detail above and are not repeated here.

In some examples, upon loading of the second document version, document presentation components 320 and/or document providing components 310 may determine one or more second document elements 332, which are document elements included within the second document version to which the data representation function 333 will be applied. In some examples, the second document elements 332 may be determined based, at least in part, on a model of the second version of the electronic document, such as a DOM tree, for example to determine the identities, types, locations and other information about document elements within the first document version. In some examples, the second document elements 332 may include all document elements within the second document version. In other examples, the second document elements 332 may include only certain types of document elements within the second document version. For example, the second document elements 332 may be filtered to include only document element types that are also within the first document elements 331 or to otherwise include and/or exclude certain document element types. As a specific example, in some cases, if the first document elements 331 include only text and image elements, then the second document elements 332 may include only text and image elements within the second document version. This may improve efficiency by, for example, reducing the need to apply data representation function 333 to document elements in the second document version that are unlikely to correspond to first document elements 331.

In some examples, the second document elements 332 may be limited to specified percentages, quantities, or other amounts of document elements within the second document version. In some examples, a smaller group of document elements may be initially selected for inclusion within the second document elements 332. If this smaller group of document elements fails to yield enough data representations that can be satisfactorily associated with first data representations 334, then additional document elements may be added to the second document elements 332, and attempts may then be made to associate data representations for those additional document elements with first document elements 331. As should appreciated, this process may be repeated by adding further additional document elements to the second document elements 332 until a sufficient amount of second data representations 335 are associated with first data representations 334.

As shown in FIG. 3, upon indication of the second document elements 332 to data representation generation components 330, data representation function 333 may be applied to the second document elements 332 in order to generate second data representations 335. In some examples, data representation function 333 may be applied to data for the second document elements (e.g., text data, pixel and other image data, etc.) that is identified and/or accessed based, at least in part, on a model of the second version of the electronic document, such as a DOM tree. It is noted that, to improve reliability of the representation comparison and association process, it may be advantageous to apply the same data representation function 333 to both the first document elements 331 and the second document elements 332. In some examples, the second data representations 335 may be stored, for example in memory.

Upon being generated, the first and second data representations 334 and 335 may be provided to data representation comparison components 340, which may generally compare the first and second data representations 334 and 335 in order to determine at least one association between at least one of first data representations 334 and at least one of the second data representations 335. In some examples, an association between data representations 334 and 335 may be determined based, at least in part, on an amount of correlation between the data representations, such as a number of matching hashes between the data representations 334 and 335. For example, in some cases, an association may be determined between each second data representation 335 that meets or exceeds a threshold amount of correlation to a first data representation 334. In some examples, the first and second data representations 334 and 335 may be compared to one another to determine a percentage of correlation to one another, and the threshold amount of correlation may be applied as a threshold percentage of correlation. Also, in some examples, associations may be determined between a specified quantity, percentage, or other amount of first and second data representations 334 and 335 that have the highest correlation to one another. In one specific example, associations may be determined for the three highest amounts of correlation between the first and second data representations 334 and 335. In another one specific example, associations may be determined for the highest ten percent of correlations between the first and second data representations 334 and 335.

Also, in some examples, associations between the first and second data representations 334 and 335 may be weighted based on various factors. For example, in some cases, the associations may be weighted based, at least in part, on locations of the respective second document elements within the second document version. In particular, if associations are determined for second data representations 335 that represent second document elements in close proximity (e.g., adjacent or neighboring document elements) to one another within the second document version, then these associations may sometimes be weighted higher than those that represent second document elements that are not in close proximity to one another (e.g., spread throughout the second document version). This is because document elements in close proximity to one another may allow the scroll position to be determined such that the closely positioned document elements may be displayed at the determined scroll position. By contrast, it may be difficult or sometimes not possible to generate a scroll position that will display document elements spread apart from each other at different portions of a document.

Figure 4:
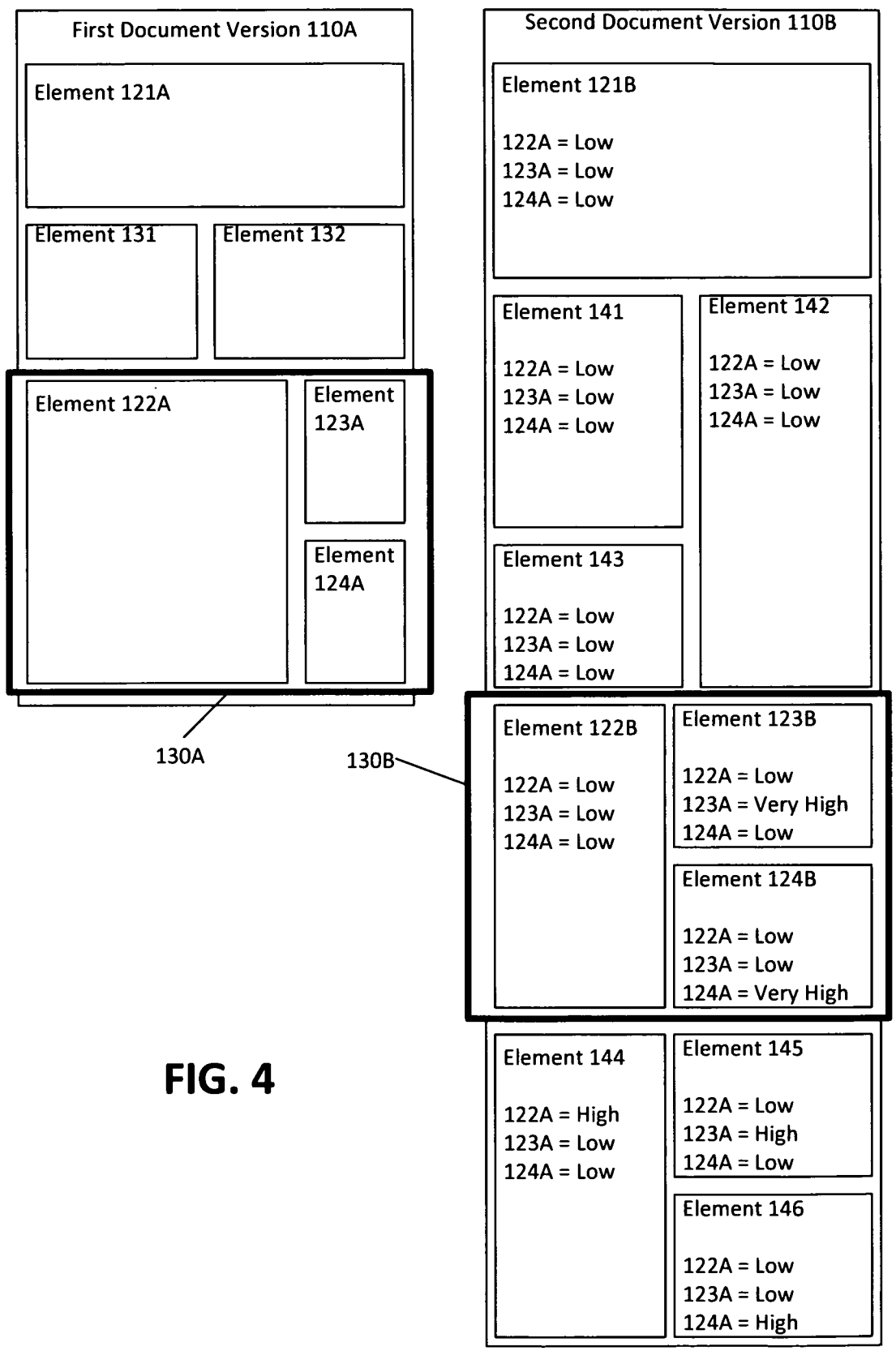
FIG. 4 is a diagram illustrating a second example element association-based scroll positioning that may be used in accordance with the present disclosure.

As another example, associations between the first and second data representations 334 and 335 may sometimes be weighted based, at least in part, on an amount or percentage of correlation between the data representations. For example, in some cases, a smaller quantity of associations with very high correlations may be weighted higher than a larger quantity of associations having lower correlations. This is because a very high correlation may sometimes be considered more reliable than a lager quantity of less reliable correlations. An example of this correlation-based weighting is shown in FIG. 4. In particular, FIG. 4 depicts the same first and second document versions 110A-B as were shown previously in FIG. 1. However, in FIG. 4, the amounts of correlation between various document element representations have been adjusted relative to those shown in FIG. 1 in order to better illustrate an example of correlation-based weighting. In particular, as shown in FIG. 4, the correlation between representations of document elements 122B and 122A is low, the correlation between representations of document elements 123B and 123A is very high, and the correlation between representations of document elements 124B and 124A is very high. Additionally, as shown in FIG. 4, the correlation between representations of document elements 144 and 122A is high, the correlation between representations of document elements 145 and 123A is high, and the correlation between representations of document elements 146 and 124A is high. Thus, based on the correlation amounts shown in FIG. 4, it can be seen that representations of document elements 122B, 123B, and 144-146 all have high or very high correlations to representations of one of document elements 122A-124A. However, it is noted that displayed portion 130B is not large enough to include all of document elements 122B, 123B, and 144-146. As shown in FIG. 4, a determination has been made to include document elements 122B and 123B in displayed portion 130B, thereby not including document elements 144-146 in displayed portion 130B. In particular, in this example, it may be determined that two very high correlations (i.e., the very high correlations between representations of document elements 123B-124B and 123A-124A) are weighted more heavily than three high correlations (i.e., the high correlations between representations of document elements 144-146 and 123A-124A). This correlation-based weighting results in displayed portion 130B being positioned over document elements 122B-124B as opposed to document elements 144-146.

As another example, associations between the first and second data representations 334 and 335 may sometimes be weighted based, at least in part, on the types of document elements whose representations are being associated. For example, in some cases, associations between representations of text elements may be weighted more heavily than associations between representations of other types of elements (e.g., images, input fields, iframes, etc.). In some examples, due to the nature of text, correlations between text elements may sometimes be considered to be more reliable then correlations between other types of document elements. In some examples, correlations between image elements may be a second most heavily weighted type of element. Also in some examples, correlations between advertisements and embedded containers (e.g., iframes and inline frames) may be weighted less heavily than other elements such as text, images and input fields.

Figure 5:
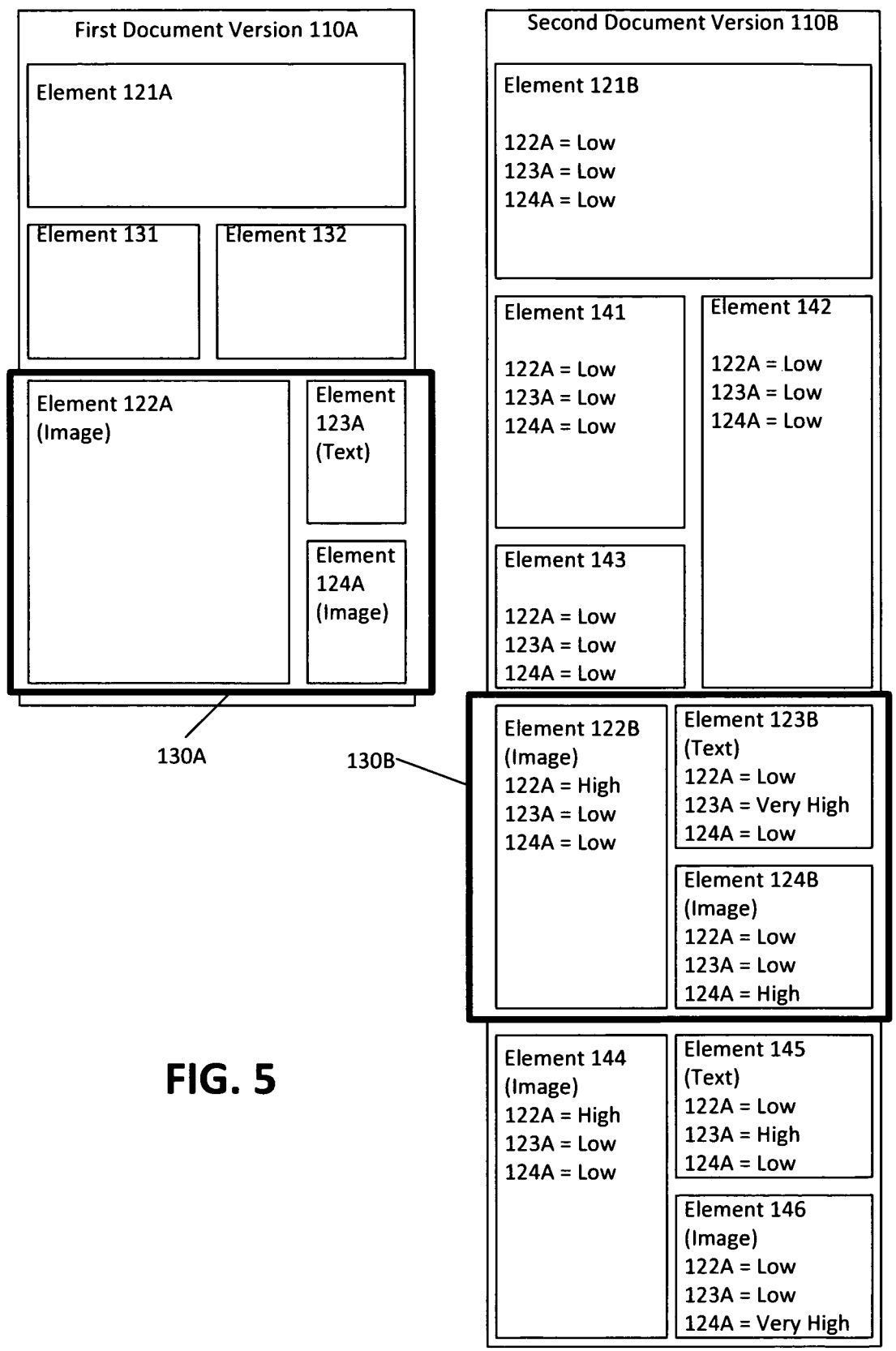
FIG. 5 is a diagram illustrating a third example element association-based scroll positioning that may be used in accordance with the present disclosure.

An example of document element type-based weighting is shown in FIG. 5. In particular, FIG. 5 depicts the same first and second document versions 110A-B as were shown previously in FIGS. 1 and 4. However, in FIG. 5, it is specified that that document elements 122A-B, 1224A-B, 144 and 146 are image elements and that document elements 123A-B and 145 are text elements. Additionally, in FIG. 5 the amounts of correlation between representations of various document elements have been adjusted relative to those shown in FIGS. 1 and 5 in order to better illustrate an example of document element type-based weighting. In particular, as shown in FIG. 5, the correlation between representations of document elements 122B and 122A is high, the correlation between representations of document elements 123B and 123A is very high, and the correlation between representations of document elements 124B and 124A is high. Additionally, as shown in FIG. 5, the correlation between representations of document elements 144 and 122A is high, the correlation between representations of document elements 145 and 123A is high, and the correlation between representations of document elements 146 and 124A is very high. Thus, based on the correlation amounts shown in FIG. 4, it can be seen that representations of document elements 122B-124B and 144-146 all have high or very high correlations to representations of one of document elements 122A-124A. However, it is noted that displayed portion 130B is not large enough to include all of document elements 122B-124B, and 144-146. As shown in FIG. 5, a determination has been made to include document elements 122B-124B in displayed portion 130B, thereby not including document elements 144-146 in displayed portion 130B. In particular, in this example, the very high correlation between representations of text elements (i.e., the very high correlations between representations of text elements 123B and 123A) is weighted more heavily than the very high correlation between representations of image elements (i.e., the very high correlations between representations of image elements 146 and 124A). This document element type-based weighting results in displayed portion 130B being positioned over document elements 122B-124B as opposed to document elements 144-146.

Thus, as set forth above, data representation comparison components 340 may compare the first and second data representations 334 and 335 in order to determine at least one association between at least one of first data representations 334 and at least one of the second data representations 335. The data representations 334 and 335 between which an association has been determined by data representation comparison components 340 are shown in FIG. 3 as associated data representations 350. In some examples, upon determining the associated data representations 350, data representation comparison components 340 may then provide identifications or other indications of the associated data representations 350 back to document providing components 310 and/or document presentation components 320. Document providing components 310 and/or document presentation components 320 may then determine, based at least in part on the associated data representations 350, a second scroll position in association with which the second document version is initially displayed. For example, in some cases, for each of the second data representations 335 included in associated data representations 350, the respective represented second document element 332 may be identified. Then, an offset value, such as a distance of the document element from a top or start of the second document version, may be determined for each of the identified second document elements 332. The second scroll position may then be determined based, at least in part, on the offset values of the identified document elements. For example, in some cases, the second scroll position may be calculated such that the second scroll position is set to be at, or near, an average offset of the identified offset values. In some examples, the average of the offset values may be weighted, for example based on types of identified document elements or on an amount of correlation between identified second document elements 332 and their associated first document elements 331. In other examples, the second scroll position may be set so as to display or partially display all, or a largest available amount, of the identified second document elements in the initially displayed portion of the second document version. For example, in FIGS. 1, 2, 4, and 5, the displayed portion 130B is determined so as to include each of document elements 122B-124B. Other priorities and techniques may also be employed for determining the second scroll position based on the associated data representations 350.

It is noted that, in some examples, other factors besides associations between first and second data representations 334 and 335 may also be taken into consideration for determining of the second scroll position. For example, in some cases, data may be collected regarding document elements to which users may manually scroll updated versions of electronic documents within a short or other specified time period after reloading of those documents. In some examples, this data may be used to form user feedback-based associations between data elements. For example, records may be maintained indicating associations between the document elements that were last displayed in a prior document version and the document elements to which users manually scrolled after displaying of the updated document version. These user feedback-based associations may then be used as additional or alternative information based upon which to determine the second scroll position. Additionally, in some examples, the offset value of the final scroll position of the prior document version may also be considered in determining the second scroll position. In some cases, these other factors (e.g., user feedback-based element associations and prior version offset) may be given more weight or greater consideration when the results of comparisons of the first and second data representations 334 and 335 are inconclusive, such as when a minimum threshold amount of correlation may not be determined between any, or between very few of, the first and second data representations 334 and 335.

It is also noted that, in some examples, data representation generation components 330 and/or data representation comparison components 340 may be located on a client, a server, and distributed across one or more clients, servers, and/or other nodes or devices. For example, in some cases, generation of the first and second data representations 334 and 335 and comparison of these representations may be performed locally on a client device. Also, in some examples, all or portions of either or both of these operations may be performed remotely on one or more servers. In some examples, performance of these operations on one or more servers may improve efficiency by reducing the amount of work performed locally by the client, whose processing power, available memory, and other computing resources may be less than, and in some cases substantially less than, those available to one or more servers. For example, in some cases, generation of the first and second data representations 334 and 335 and comparison of these representations may be performed entirely on one or more servers. In some examples, this may be particularly advantageous for remote desktop and other thin client applications, such as when server components may be employed to handle scrolling of the document and may be able to easily determine the document elements that are displayed during scrolling.

As another example, in some cases, the first data representations 334 may be generated by the client and transmitted to the server. The server may then generate the second data representations 335, perform the comparison of the first and the second data representations 334 and 335, determine the second scroll position for display of the second document version, and then report this determination back to the client. In some examples, this may be particularly advantageous for traditional web-browsing applications, such as when server components may transmit web documents to clients that, in turn, effectuate display and scrolling of the documents.

Figure 6:
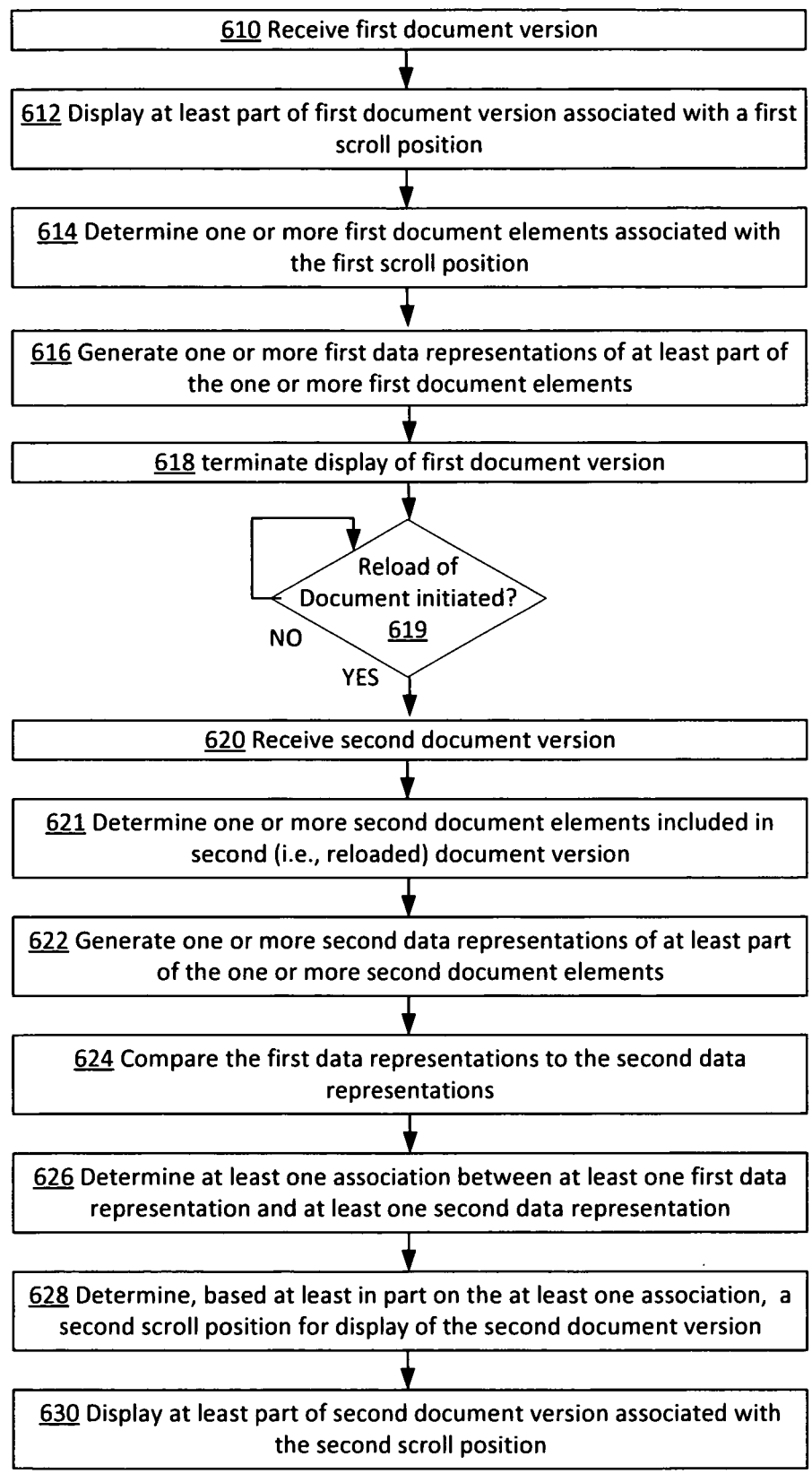
FIG. 6 is a diagram illustrating example element association-based scroll positioning process that may be used in accordance with the present disclosure.

FIG. 6 is a diagram illustrating an example element association-based scroll positioning process that may be used in accordance with the present disclosure. At operation 610, a first version of an electronic document (also referred to herein as a first document version), such as first document version 110A of FIG. 1, is received. For example, at operation 610, a first version of a web page may be loaded or otherwise received by a web browser or other document presentation component. As set forth above, the first document version may include a number of document elements, such as such as text, images, input fields, advertisements, links to other documents, nested documents, embedded containers that include information from other documents (e.g., iframes), and others. For example, first document version 110A of FIG. 1 includes document elements 121A-124A and 131-132.

At operation 612, at least part of the first document element corresponding to a first scroll position is displayed. As set forth above, in some examples, a scroll position may represent an offset or distance from a top or other starting point of a document to a displayed portion of the document. For example, referring back to FIG. 1, it is seen that a displayed portion 130A of the first document version 110A corresponds to a first scroll position, such as an offset or distance from a top of first document version 110A to displayed portion 130A.

At operation 614, one or more first document elements associated with the first scroll position are determined from the plurality of document elements included with the first document version. As set forth above, in some examples, the first document elements may include document elements that within a specified distance relative to the first scroll position and/or that are at least partially included within the portion of the electronic document displayed at operation 612. For example, referring back to FIG. 1, document elements 122A-124A are included within displayed portion 130A and are determined to be associated with the first scroll position. Also, in some examples, the first document elements may include document elements positioned outside of the displayed portion of the first document version, such as one or more adjacent document elements. In some examples, a displayed portion of the first document version and/or an area adjacent or otherwise close to the displayed portion of the first document version may be sampled, for example using a pattern, to select the first document elements. Various other example considerations for determination of the first document elements are described in detail above and are not repeated here.

At operation 616, one or more first data representations of at least part of the one or more first document elements are generated. As set forth above, the one or more first data representations may be generated, at least in part, by applying one or more data representation functions, such as data representation function 333 of FIG. 3, to the one or more first document elements. In some examples, to generate a first data representation, a data representation function may be applied to at least part of a single first document element or to at least part of multiple first document elements. As also set forth above, some example data representation functions may include a rolling hash or other hash function, a checksum function, a lossy compression algorithm, a Fourier Transform algorithm, a fingerprint algorithm, a delta encoding algorithm, and other data representation functions. The data representation function may, in some examples, reduce the amount of storage capacity required to store a data representation in comparison to a document element that the data representation represents. Many other example characteristics of data representation functions are described in detail above and are not repeated here. In some examples, the one or more first data representations may be stored, for example in memory for later use. In some examples, it may not be necessary to apply a data representation function to a first document element in order to generate a first data representation. Rather, the first data representation may instead be generated by extracting data that is included within or otherwise associated with the first document element without necessarily applying a data representation function to the first document element.

At operation 618, a display of the first document version is terminated. As set forth above, this may occur, for example, when instructions are received to refresh or otherwise reload the electronic document, to navigate to another electronic document (e.g., via a back or forward command), or to close the document presentation components 320.

In some examples, operations 614 and 616 may be repeated each time that the first document version is scrolled to a new scroll position. This may help to ensure that, whenever the display of the first document version is terminated, data representations of data elements associated with the last scroll position of the document have been generated and stored. Also, in some examples, when the first document version is scrolled to a new scroll position, the data representations of data elements associated with the prior scroll position of the document may be deleted, for example in order to preserve available storage.

At operation 619, it is determined whether a reloading of the electronic document is initiated. As set forth above, in some examples, reloading of the electronic document may be initiated in response to entering the document address into a document presentation program, activating a back, forward, or refresh control, and other operations. As also set forth above, reloading of the electronic document may cause a second version of the electronic document (also referred to herein as a second document version), such as second document version 110B of FIG. 1, to be loaded, for example by a web browser or other document presentation program. At operation 620, the second document version is received. For example, at operation 620, the second document version may be loaded or otherwise received by a web browser or other document presentation component At operation 621, one or more second document elements included within the second document version are determined. As set forth above, the second document elements are document elements included within the second document version to which a data representation function will be applied. As also set forth above, in some examples, the second document elements may include all document elements within the second document version. In other examples, the second document elements may include only certain types of document elements within the second document version. For example, the second document elements may be filtered to include only document element types that are also within the first document elements or to otherwise include and/or exclude certain document element types.

At operation 622, one or more second data representations of at least part of the one or more second document elements are generated. As set forth above, the one or more second data representations may be generated, at least in part, by applying one or more data representation functions, such as data representation function 333 of FIG. 3, to the one or more second document elements. In some examples, to generate a second data representation, a data representation function may be applied to at least part of a single second document element or to at least part of multiple second document elements. As also set forth above, to improve reliability of the representation comparison and association process, it may be advantageous to apply the same data representation function to both the first document elements and the second document elements. In some examples, the one or more second data representations may be stored, for example in memory. In some examples, it may not be necessary to apply a data representation function to a second document element in order to generate a second data representation. Rather, the second data representation may instead be generated by extracting data that is included within or otherwise associated with the second document element without necessarily applying a data representation function to the second document element.

At operation 624, the first and the second data representations may be compared, and, at operation 626, at least one association may be determined between at least one of first data representations and at least one of the second data representation. As set forth above, in some examples, an association between one or more of the first and the second data representations may be determined based, at least in part, on an amount of correlation between the data representations, such as a number of matching hashes between the first and the second data representations. For example, in some cases, an association may be determined between each second data representation that meets or exceeds a threshold amount of correlation to a first data representation. Also, in some examples, associations may be determined between a specified quantity, percentage, or other amount of first and second data representations that have the highest correlation to one another. Also, in some examples, associations between the first and second data representations may be weighted differently based on various factors for purposes of determining the second scroll position. For example, in some cases, the associations may be weighted based, at least in part, on locations of the respective second document elements within the second document version. As another example, associations between the first and second data representations may sometimes be weighted based, at least in part, on an amount or percentage of correlation between the data representations (e.g., as shown in the example of FIG. 4). As yet another example, associations between the first and second data representations may sometimes be weighted based, at least in part, on the types of document elements whose representations are being associated (e.g., as shown in the example of FIG. 5). Various other examples of techniques for comparing and determining associations between first and second data representations are described in detail above and are not repeated here.

At operation 628, a second scroll position for display of the second document version is determined based, at least in part, on the at least one association determined at operation 630. As set forth above, in some examples, for each of the second data representations included in the associated data representations, the respective represented second document element may be identified. Then, an offset value, such as a distance of the document element from a top or start of the second document version, may be determined for each of the identified second document elements. The second scroll position may then be determined based, at least in part, on the offset values of the identified document elements. For example, in some cases, the second scroll position may be calculated such that the second scroll position is set to be at, or near, an average offset of the identified offset values. Also, in some examples, the second scroll position may be set so as to include or partially include all, or a largest available amount, of the identified second document elements in the initially displayed portion of the second document version.

At operation 630, at least part of the second document version associated with the second scroll position is displayed. For example, as shown in FIG. 1, the displayed portion of 130B of the second document version 110B includes each of document elements 122B-124B, which correspond to document elements 121A-124A of first document version 110A. As set forth above, in some examples, the at least part of the second document version displayed at operation 630 may be displayed, for example automatically, upon loading of the second document version without being scrolled to or otherwise selected by a user. As set forth above, this may be advantageous, for example, by providing greater continuity for the user, reducing or eliminating user confusion when a page is reloaded, and reducing or eliminating the need to search for elements that were displayed at the first scroll position prior to reloading.

As set forth above, such as described with reference to FIG. 2, some conventional techniques may determine the scroll position for a reloaded document using offset-only techniques, in which the scroll position for the reloaded document version is set to have the same offset as the final scroll position for the prior loaded document version. It is noted that, in some examples, a scroll position for the reloaded document version may sometimes be determined more quickly using these conventional offset-only techniques than using the element association techniques described herein. Accordingly, in some examples, during the time that the scroll position for the reloaded document version is being determined using the element association techniques (e.g., during the performance of operations 621-628), an initial scroll position for the reloaded document may be determined using the conventional offset-only techniques and the document may be initially displayed using the initial offset-only scroll position. Subsequently, when the second scroll position for the document is determined using the element association techniques at operation 628, the scroll position of the second document version may then be adjusted (if necessary) to the determined second scroll position. Additionally, in some examples, during the performance of operations 621-628, an initial scroll position for the document may also sometimes be set to a default document position or may otherwise be determined using any other appropriate techniques.

Figure 7:
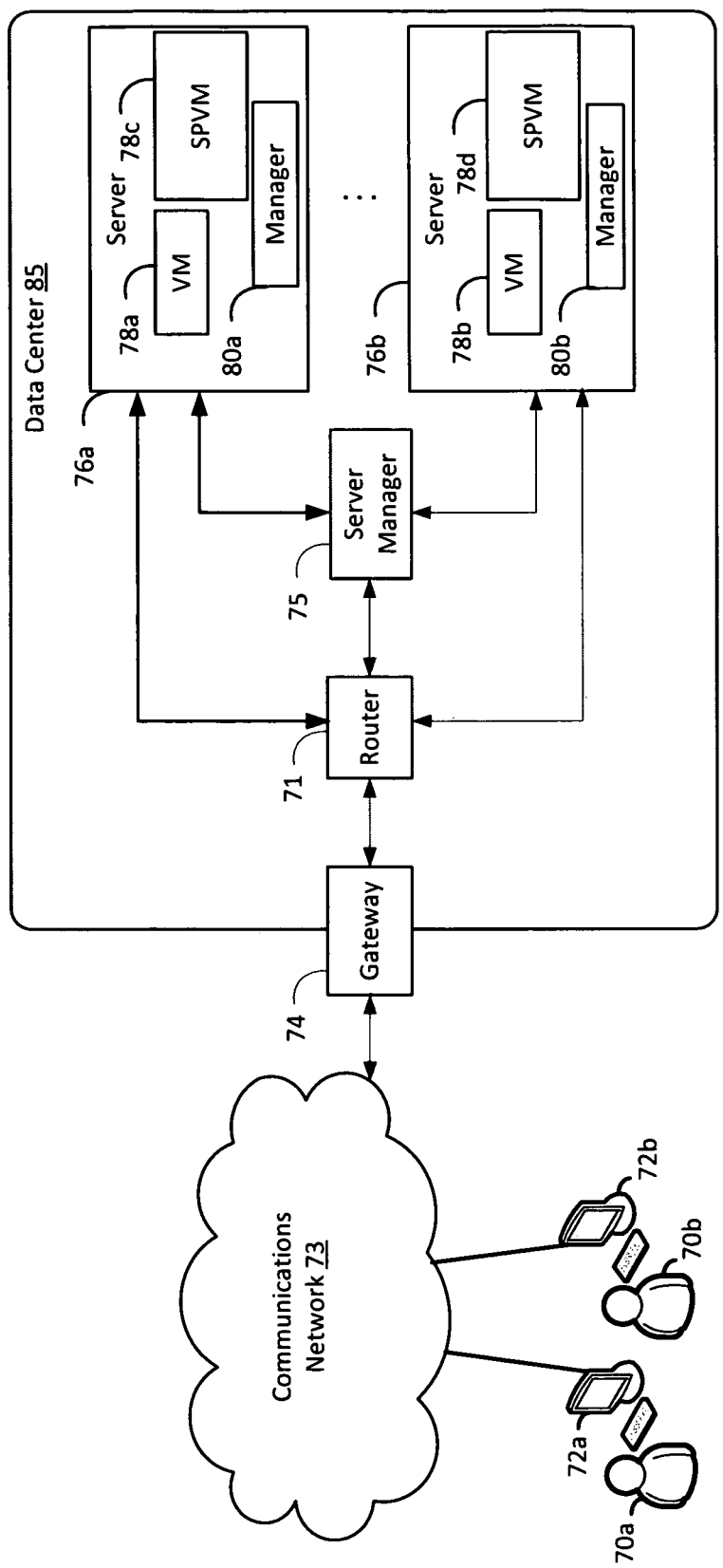
FIG. 7 is a diagram illustrating an example system for transmitting and providing data that may be used in accordance with the present disclosure.

An example system for transmitting and providing data, such as data associated with one or more electronic documents, will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are scroll positioning ("SPVM") instances. The SPVM virtual machine instances 78c and 78d may be configured to perform all, or any portion, of the scroll positioning techniques and/or any other of the disclosed techniques in accordance with the present disclosure and described in detail above. As should be appreciated, while the particular example illustrated in FIG. 7 includes one SPVM virtual machine in each server, this is merely an example. A server may include more than one SPVM virtual machine or may not include any SPVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
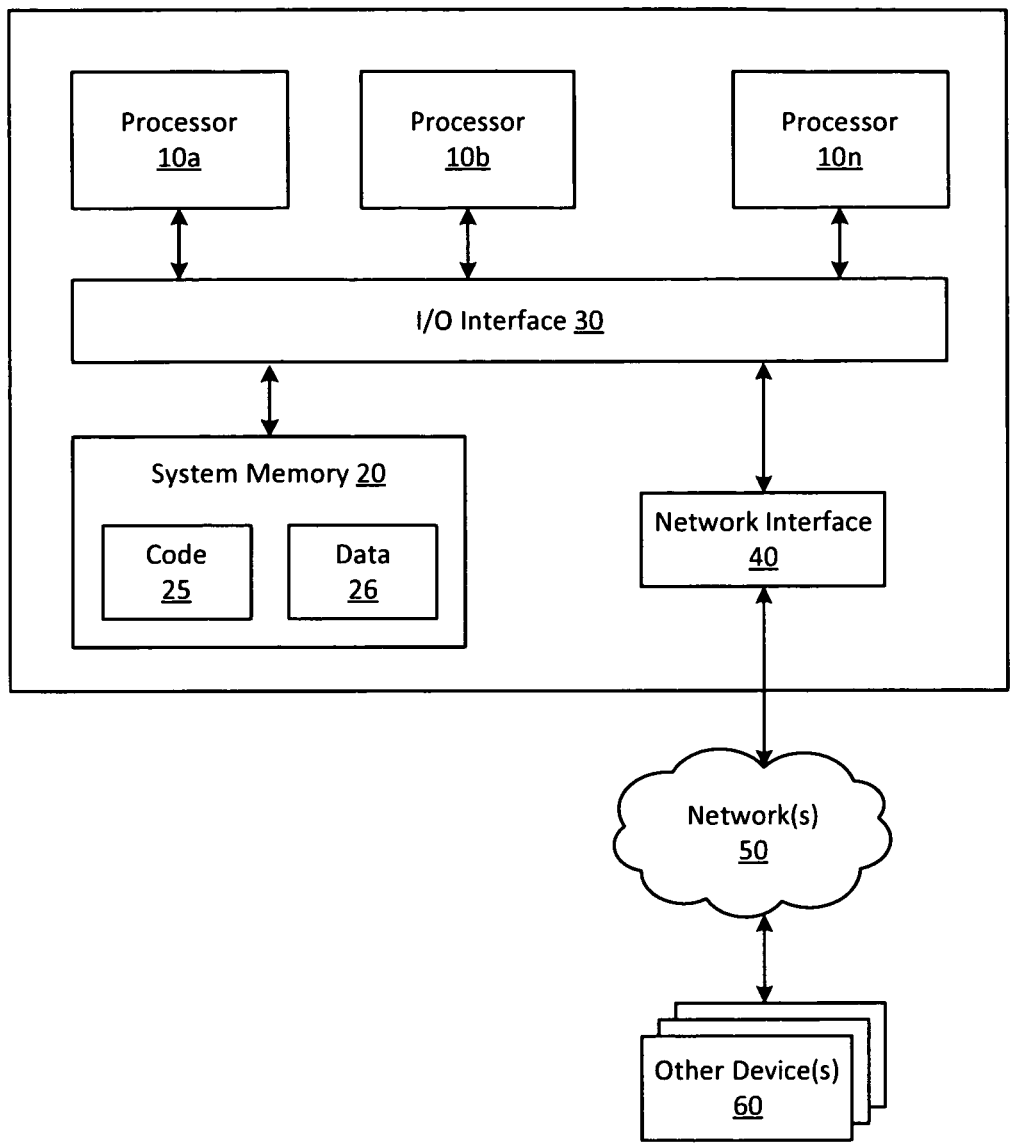
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for scroll positioning of a web page comprising:
   one or more processors; and one or more memories having stored therein instructions that, upon execution by the one or more processors, cause the computing system perform operations comprising:
- receiving a first version of the web page comprising a first plurality of document elements;
- determining, from the first plurality of document elements, two or more first document elements associated with a first scroll position of the first version of the web page;
- generating first data representations of the two or more first document elements;
- receiving a second version of the web page comprising a second plurality of document elements that is at least partially different from the first plurality of document elements;
- generating second data representations of the second plurality of document elements;
- comparing the first data representations to the second data representations;
- determining a plurality of associations between the first data representations and the second data representations; and
- determining, based at least in part on the plurality of associations, a second scroll position for display of the second version of the web page, wherein the plurality of associations are weighted based at least in part on a locational proximity of the second plurality of document elements within the second version of the web page.

2. The computing system of claim 1, wherein at least one data representation function used to generate the first data representations and the second data representations comprises at least one of a hash function, a checksum function, a lossy compression algorithm, a Fourier Transform algorithm, a fingerprint algorithm, or a delta encoding algorithm.

3. The computing system of claim 1, wherein the two or more first document elements are determined based, at least in part, on a document object model (DOM) tree.

4. A method for scroll positioning of an electronic document comprising:
- receiving a first version of the electronic document comprising a first plurality of document elements;
- determining, from the first plurality of document elements, two or more first document elements associated with a first scroll position of the first version of the electronic document;
- storing first data representations of the two or more first document elements;
- receiving a second version of the electronic document comprising a second plurality of document elements that is at least partially different from the first plurality of document elements;
- storing second data representations of the second plurality of document elements;
- comparing the first data representations to the second data representations;
- determining a plurality of associations between the first data representations and the second data representations; and
- determining, based at least in part on the plurality of associations, a second scroll position for display of the second version of the electronic document, wherein the plurality of associations are weighted based at least in part on a locational proximity of the second plurality of document elements within the second version of the electronic document.

5. The method of claim 4, further comprising:
- generating the first data representations by applying at least one data representation function to the two or more first document elements; and
- generating the second data representations by applying the at least one data representation function to the second plurality of document elements, and wherein the at least one data representation function comprises at least one of a hash function, a checksum function, a lossy compression algorithm, a Fourier Transform algorithm, a fingerprint algorithm, or a delta encoding algorithm.

6. The method of claim 4, wherein the two or more first document elements are determined based, at least in part, on a document object model (DOM) tree.

7. The method of claim 4, wherein the plurality of associations are determined, based at least in part, on an amount of correlation between the first data representations and the second data representations.

8. The method of claim 4, wherein at least part of the second version of the electronic document associated with the second scroll position is displayed upon loading of the second version of the electronic document without being selected by a user.

9. The method of claim 4, wherein the electronic document is a web page.

10. The method of claim 4, wherein the second plurality of document elements is at least partially different from the first plurality of document elements.

11. The method of claim 4, further comprising sampling at least one of a displayed portion of the first version of the electronic document or an area adjacent to the displayed portion of the first version of the electronic document using a pattern to select the two or more first document elements.

12. One or more non-transitory computer-readable storage media having stored thereon instructions that, upon execution by one or more compute nodes, cause the one or more compute nodes to perform operations comprising:
- receiving a first version of an electronic document comprising a first plurality of document elements;
- determining, from the first plurality of document elements, two or more first document elements associated with a first scroll position of the first version of the electronic document;
- storing first data representations of the two or more first document elements;
- receiving a second version of the electronic document comprising a second plurality of document elements that is at least partially different from the first plurality of document elements;
- storing second data representations of the second plurality of document elements;
- comparing the first data representations to the second data representations;
- determining a plurality of associations between the first data representations and the second data representations; and
- determining, based at least in part on the plurality of associations, a second scroll position for display of the second version of the electronic document, wherein the plurality of associations are weighted based at least in part on a locational proximity of the second plurality of document elements within the second version of the electronic document.

13. The one or more non-transitory computer-readable storage media of claim 12, wherein the operations further comprise:

generating the first data representations by applying at least one data representation function to the two or more first document elements; and generating the second data representations by applying the at least one data representation function to the second plurality of document elements, and wherein the at least one data representation function comprises at least one of a hash function, a checksum function, a lossy compression algorithm, a Fourier Transform algorithm, a fingerprint algorithm, or a delta encoding algorithm.

14. The one or more non-transitory computer-readable storage media of claim 12, wherein the plurality of associations are determined, based at least in part, on an amount of correlation between the first data representations and the second data representations.

15. The one or more non-transitory computer-readable storage media of claim 12, wherein at least part of the second version of the electronic document associated with the second scroll position is displayed upon loading of the second version of the electronic document without being selected by a user.

\* \* \* \* \*